Oct. 14, 1958

J. B. DYER 2,855,784

WINDSHIELD WIPER MECHANISM

Filed March 22, 1954

INVENTOR.
JOHN B. DYER
BY
George H. Strickland
HIS ATTORNEY

Oct. 14, 1958 J. B. DYER 2,855,784
WINDSHIELD WIPER MECHANISM
Filed March 22, 1954 3 Sheets-Sheet 2
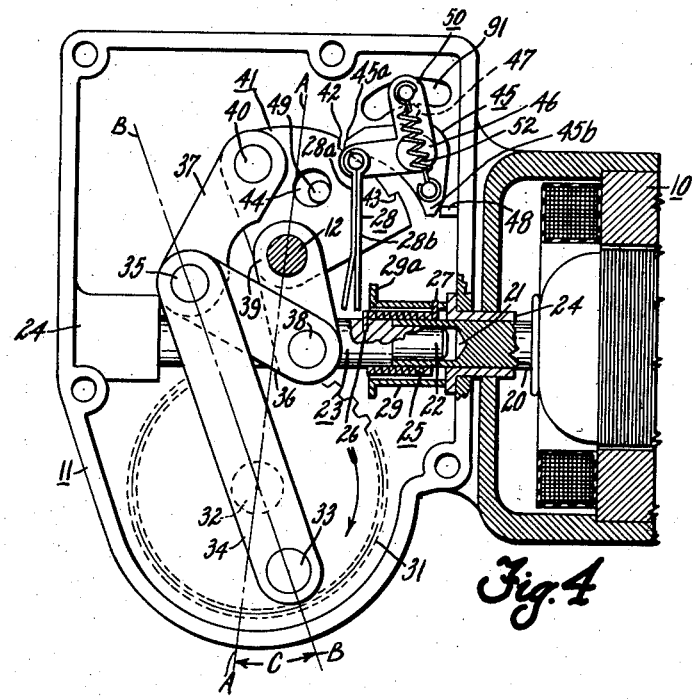
Fig. 4
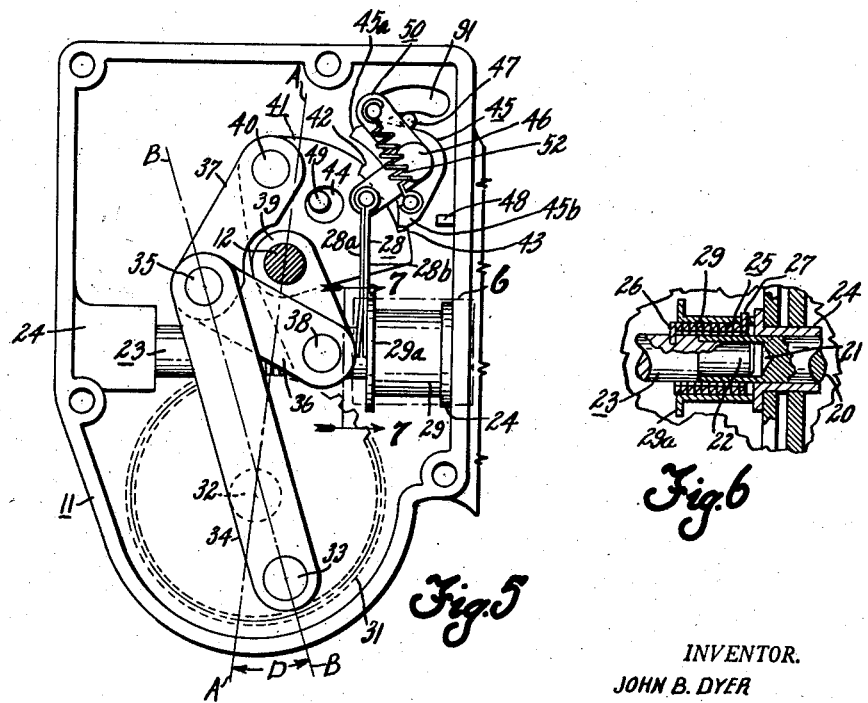
Fig. 5
Fig. 6
INVENTOR.
JOHN B. DYER
BY
George H. Strickland
HIS ATTORNEY Oct. 14, 1958  J. B. DYER  2,855,784
WINDSHIELD WIPER MECHANISM
Filed March 22, 1954  3 Sheets-Sheet 3

INVENTOR.
JOHN B. DYER
BY
George W. Strickland
HIS ATTORNEY

United States Patent Office 2,855,784
Patented Oct. 14, 1958

2,855,784
WINDSHIELD WIPER MECHANISM

John B. Dyer, Syracuse, N. Y., assignor to General Motors Corporation, Detroit, Mich., a corporation of Delaware Application March 22, 1954, Serial No. 417,707

15 Claims. (Cl. 74—70)

This invention pertains to windshield wiper actuating mechanism, and particularly to actuating mechanisms of the power driven type.

One of the most difficult problems encountered in the design of power driven wiper actuating mechanisms, is that of providing means for parking the wiper blades out of the normal range of vision, beyond the end of the normal wiping stroke. In actuating mechanisms wherein means are provided for converting rotation into oscillation, the mechanism must also be capable of adjustment so as to vary the amplitude of oscillation imparted to a driven member. This problem has been solved heretofore in numerous ways, such as by using a variable length crank arm or connecting rod. However, the mechanism must also incorporate some means for interrupting the driving connection between the driving and driven members after the wiper blades are parked to assure that the blades will remain in the parked position. In this invention, the driving connection is automatically interrupted by clutch means when the wiper blades reach the parked position. Accordingly, among my objects are the provision of mechanical movement for converting rotation into oscillation including means for varying the amplitude of oscillation imparted to a driven member; the further provision of an actuating mechanism including means for automatically interrupting the driving connection between the driving and driven members when the amplitude of oscillation imparted to the latter is a maximum; and the still further provision of an actuating mechanism driven by an electric motor including automatically operable switch means to deenergize the motor after the wiper blades have been moved to the parked position.

The aforementioned and other objects are accomplished in the present invention by providing means for simultaneously, or coincidentally, disengaging the clutch means and deenergizing the motor after the blades have been moved to the parked position. Specifically, the mechanism includes a motion converter, or mechanical movement which comprises a connecting rod, one end of which is pivotally connected to a crank pin that is eccentrically carried by a rotatable driving element. Thus, the rotatable driving element constitutes a crank for imparting movement to the connecting rod. In the disclosed embodiment, the rotatable driving element is operatively connected to and driven by a unidirection electric motor, which constitutes the driving member. However, it is to be understood that the use of an electric motor is only exemplary, and is not to be construed as a limitation since it is readily apparent that the rotatable crank member could be driven by other power means.

The mechanical movement also includes an operating link, one end of which is pivotally connected to the free end of the connecting rod, and a setting, or adjusting link. The operating and adjusting links are pivotally interconnected, the point of pivotal interconnection therebetween being common with that of the connecting rod, whereby during rotation of the driving element, swinging forces are applied to the point of pivotal connection between the links. The operating link is pivotally connected at its other end to a radially extending arm of the driven member, or wiper actuating shaft. The other end of the setting link is pivotally connected to the end of a lever, the lever being rotatably journaled on the driven shaft. The pivot point connection of the adjusting link, which is carried by the lever, is movable as will be described more fully hereinafter. Moreover, displacement of the movable pivot point of the setting link results in variation in the effective operating length of the connecting rod, and thereby constitutes the means for varying the amplitude of oscillation imparted to the driven member. The effective operating length of the connecting rod may be varied by altering the angular relationship between a line which intersects the axes of the driving element and driven member, and a line which intersects the pivotal connections of the connecting rod. The lever which carries the movable pivot connection of the setting link has formed thereon a notch, opposite end portions of which are engageable with opposite ends of a retaining and locating element. The position of the retaining and locating element determines the position of the lever, inasmuch as it restrains movement thereof due to the swinging forces applied to the links by the connecting rod. Hence, the locating element determines the position of the movable pivot point of the setting link, and thereby determines the amplitude of oscillation imparted to the driven member. The locating element is pivotally mounted within the housing which encloses the motion converting mechanism. The locating element is movable about its pivotal connection between predetermined limits within the housing, movement of the locating element being effected by a pivoted operating member which is operatively connected to the locating element through an over-center, toggle-type spring mechanism.

The oscillatable driven shaft is formed with a lug extension, which lug extension is adapted to actuate a parking switch concurrently with the release of the clutch means when the wiper blades have been moved to the parked position. As stated hereinbefore, the rotatable driving element is operatively connected to a rotary power source, such as an electric motor. This operative connection is constituted by a shaft and a coil spring clutch. The spring clutch is arranged to drivingly interconnect the motor driven shaft, or driving member, and the shaft which rotates the driving element. Accordingly, the spring constituting the clutch has one end attached to the driving shaft and the other end attached to a sleeve encompassing the two shafts, which have coaxially arranged portions. Normally, the closely wound convolutions of the spring will establish a driving connection between the two shafts. However, when the wiper blades are moved to the parked position, the radial arm of the oscillatable shaft engages a spring member carried by the movable pivot carrying lever and deflects the same into operative engagement with the sleeve, thereby forming a friction type brake, which restrains rotation of the sleeve and thereby causes the coil spring clutch to unwind. In this manner, the driving connection between the two shafts is interrupted and simultaneously therewith, the lug extension opens the parking switch.

In the disclosed embodiment, the force for displacing the movable pivot point of the setting link is derived from the swinging connecting rod, or more particularly from the rotating driving member. When the locating element is adjusted so as to permit movement of the lever, swinging movement imparted to the links by the connecting rod will effect movement of the lever to a parked position, and, thus, the movable pivot point for the setting link will be displaced. When the movable pivot point for the setting link is displaced so as to vary the angle between the line intersecting the axes of the driving element and driven member, and the line intersecting the pivotal connections of the connecting rod, the amplitude of oscillation imparted to the driven member will, likewise, be varied and the wiper blades will be moved to the parked position whereupon the driving connection between the driving and driven members will be disrupted and the electric motor will be deenergized.

Further objects and advantages of the present invention will be apparent from the following description, reference being had to the accompanying drawings wherein a preferred embodiment of the present invention is clearly shown.

In the drawings:

Fig. 4 is a view similar to Fig. 3 with the mechanism in a running position at the other end of the wiping stroke.

Fig. 5 is a fragmentary view, in elevation, similar to Fig. 3 with the several parts in the parked position.

Fig. 6 is a fragmentary sectional view taken generally within the arrow of rectangle 6 of Fig. 5.

Figure 1:
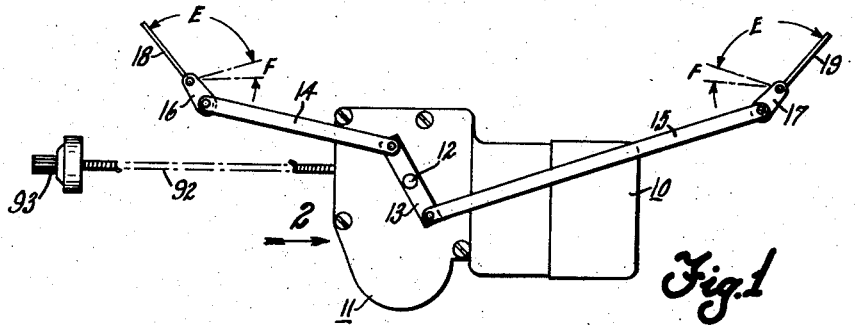
Fig. 1 is a diagrammatic view of a typical windshield wiper arrangement employing the actuating mechanism of this invention.
Figure 2:
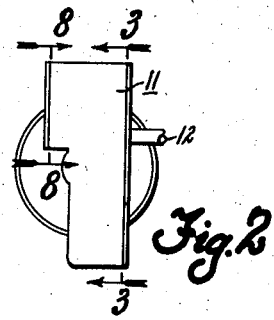
Fig. 2 is a view, in elevation, of the mechanism taken in the direction of arrow 2 in Fig. 1.

With particular reference to Figs. 1 and 2, the actuating mechanism is shown including a unidirectional D. C. motor 10, the casing of which is attached to the housing 11 of the motion converting mechanism to be described. Projecting from the motion converting mechanism is a driven shaft, or member, 12 having attached thereto a crank plate 13 to which links 14 and 15 are pivotally connected. Links 14 and 15 are also pivotally connected to actuating arms 16 and 17, respectively, for wiper blades 18 and 19, which are adapted for oscillating movement across the surface of a windshield, not shown. The shaft 12 may be oscillated throughout a fixed arc which defines the wiping stroke E of the wiper blades and in addition, the amplitude of oscillation imparted to shaft 12 may be increased so as to move the wiper blades throughout the angle $E+F$ to a parked position beyond the end of their normal wiping strokes, at which time, they are preferably disposed in contiguous relation to the cowl structure of the motor vehicle, not shown.

Figure 3:
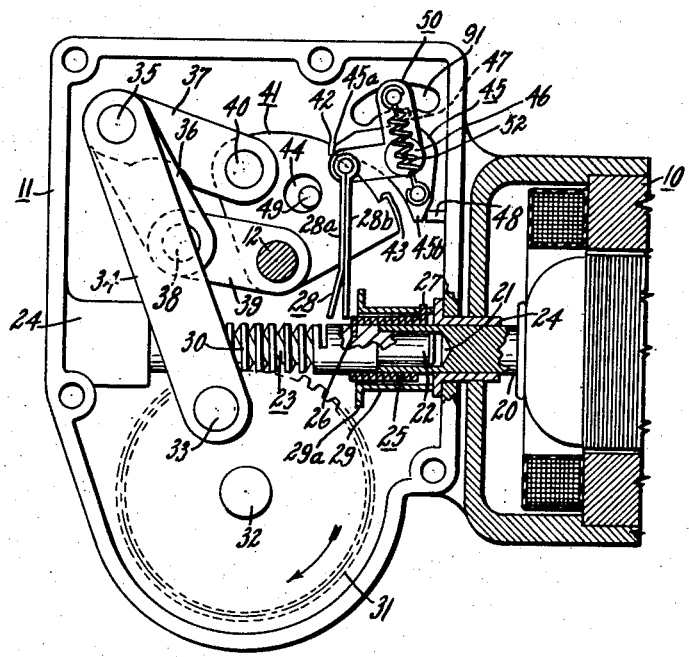
Fig. 3 is an enlarged fragmentary view, partly in elevation and partly in section, taken along line 3—3 in Fig. 2, depicting the mechanism in the running position at one end of the wiping stroke.

With particular reference to Fig. 3, the motion converting mechanism, or mechanical movement will be described. Basically, the mechanical movement is similar to that disclosed and claimed in my copending application, Serial No. 376,033, filed August 24, 1953. Accordingly, the mechanism is depicted as being driven by the electric motor 10 having an armature shaft 20, which projects into the housing 11. The armature shaft 20 is formed with a circular recess 21, the recess 21 being adapted to receive a reduced diameter end portion 22 of a worm shaft 23. The worm shaft 23 is supported by suitable bearing means 24 within the housing 11. The coaxially arranged portions of the two shafts 20 and 23 are encompassed by a coil spring clutch 25, which comprises a spring having tightly wound convolutions, one end, 26, of which is attached to shaft 23, and the other end, 27, of which is attached to a sleeve 29, which encompasses the coaxially arranged portions of the two shafts. Hereinafter, the shaft 29 will be referred to as the driving member. The closely spaced convolutions of the spring 25 normally engage portions of the shaft 20 and the shaft 23 and in so doing constitute a driving connection for transmitting movement between the two shafts. The flange 29a of sleeve 29 is arranged to be engaged by a leaf spring assembly 28. The leaf spring assembly includes arms 28a and 28b. When the leaf spring arm 28b engages the flange of sleeve 29, rotation thereof is restrained and, accordingly, the spring 25 will unwind to thereby interrupt the driving connection between the shaft 20 and the shaft 23. The means for deflecting the spring arm 28b into frictional engagement with the sleeve 29 will be described more particularly hereinafter. Suffice it here to say that the spring assembly 28 is supported by a lever 50.

The shaft 23 includes a worm portion 30, which engages a worm gear 31, or driving element, for the mechanical movement, to be described. The worm gear is attached to a shaft 32 which is rotatably supported by any suitable bearing means, not shown, in the housing 11. The worm gear 31 also carries a bearing 33 eccentrically disposed with respect to the axis thereof, the bearing 33 constituting a crank pin. A connecting rod 34 has one end pivotally connected to the crank pin 33, the other end thereof being pivotally connected at 35 to one end of an operating link 36. The pivot point 35 is also connected to one end of a setting, or adjusting link 37 whereby swinging forces are imparted to the links 36 and 37 at their point of pivotal interconnection with the connecting rod, during rotation of the driving element 31. The other end of the operating link 36 is pivotally connected at 38 to a radially extending arm 39 attached to the driven shaft 12. The mechanical movement thus far described is capable of imparting oscillation of fixed magnitude to the shaft 12 during rotation of the gear 31.

In order to vary, or more particularly to increase, the amplitude of oscillatory movement imparted to the driven member 12, means are provided for varying, or more particularly increasing, the effective operating length of the connecting rod 34. These means comprise a movable pivot point 40 for the setting link 37. The movable pivot point 40 is carried by a lever 41, which is journaled for rotation about the driven shaft 12. The peripheral surface of the lever 41 is formed with a notch having two shoulders 42 and 43, and the lever 41 is also formed with an intermediate aperture 44. When the movable pivot point 40 of the setting link 37 is displaced, by means to be described, the angular relationship between the line A—A of Figs. 4 and 5, which line intersects the axes of the driving element and driven member, and the line B—B which intersects the pivot point connections of the connecting rod may be varied from the angle C of Fig. 4 to the angle D of Fig. 5, and vice versa.

The means for determining the position of the lever 41, and, hence, the movable pivot point 40, comprises a locating and retaining element 45, which is pivotally mounted at 46. The locating element 45 is movable about its pivotal connection between predetermined limits within the housing 11, which limits are determined by a pair of stop pins 47 and 48. The surface of the element 45, which is disposed in contiguous relation to the lever 41, is of concave configuration, the radius of which permits movement of the lever 41 between the positions it is shown in Figs. 3 and 5. The movement of the lever 41 is limited by a stop pin 49, attached to the housing 11, which stop pin projects through the aperture 44 in the lever.

The position of the retaining element 45 is determined by an operating element, or lever, 50, which is adapted for movement about a pivot 46 carried by the housing 11. The operating element is interconnected with the retaining element 45 by means of an over-center, toggle type spring 52, such that movement of the lever 50 about the pivot point 46 will effect pivotal movement of the element 45 about its pivot point 46. The element 45 is, in turn, formed with a pair of projections 45a and 45b, which are adapted to engage shoulders 42 and 43, respectively, of the lever 41.

In Figs. 3 and 4, the operating element 50 and the locating element 45 are shown in the running position, at which time, the element 45 engages the stop pin 48. With reference to Fig. 5, it may be seen that the operating element 45 has been moved into engagement with stop pin 47, which constitutes the parking position thereof. Pivotal movement of the element 45 into engagement with stop pin 47 will result in disengagement of ear 45a and the edge 42 whereupon the lever 41 may move in a clockwise direction, as viewed in Fig. 3, to the position shown in Fig. 5 whereupon the stop pin 49 will engage the other end of the aperture 44. At this time, ear 45b will engage shoulder 43, and the spring assembly 28 will be moved to the position of Fig. 5. Pivotal movement of the lever 41, when freed by the element 45, is effected by the connecting rod 34 in applying swinging movement to the links 36 and 37. Thus, the movement of lever 41 from the position of Fig. 3 to the position of Fig. 5, is effected when the connecting rod 34 moves between its dead center positions from that of Fig. 4 to that of Fig. 3. Accordingly, the movable point 40 of the setting link 37 will be displaced so as to vary the angle between the lines A—A and B—B, thereby increasing the amplitude of oscillation imparted to the driven member 12 during rotation of the gear 31. In so doing, it may be seen that the arm 39 attached to the shaft 12 is moved throughout a greater angular distance in a counterclockwise direction from the position of Fig. 4 to the position of Fig. 5. The arm 39 is adapted to engage the spring arm 28a only when the amplitude of oscillation imparted to shaft 12 is at maximum, as shown in Fig. 5, since it is only at this time that the spring assembly 28 is positioned in the path of movement of arm 39.

With particular reference to Figures 3 and 4, it may be seen that during normal running operation of the mechanical movement, heretofore described, which results in movement of the wiper blades 18 and 19 throughout their wiping strokes E, the arm 39 does not come into contact with the leaf spring assembly 28. However, when the pivot point 40 is displaced from the position shown in Fig. 4 to the position shown in Fig. 5, the lever 50 will have been moved to the position of Fig. 5, thereby effecting downward movement of the spring assembly 28 so that the arm 39 engages leaf spring arm 28a and deflects the arm 28b into contact with the flange 29a of sleeve 29. In this manner, as shown particularly in Fig. 7, rotation of the sleeve 29 is restrained, thereby causing the coil spring 25 to unwind and interrupt the driving connection between shafts 20 and 23 when the wiper blades reach the parked position.

Figure 8:
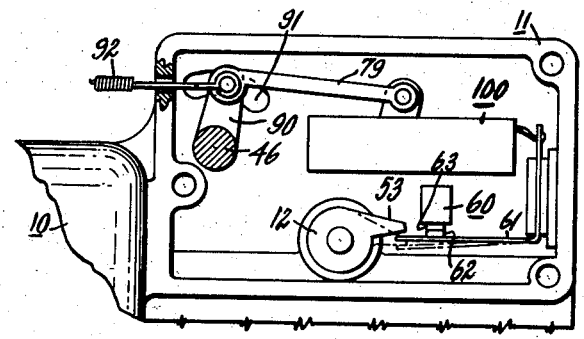
Fig. 8 is an enlarged fragmentary view, partly in section and partly in elevation, taken along line 8—8 of Fig. 2.

As shown in Fig. 8, the shaft 12 is formed with a lug 53 that is arranged to open a parking switch 60 disposed within the housing 11. The parking switch 60 includes a leaf spring 61 having a contact 62, which normally engages a stationary contact 63. The spring 61 is deflected by lug 53 to separate contacts 62 and 63 substantially concurrently with the disengagement of clutch 25, when the shaft 12 has imparted thereto its maximum amplitude of oscillatory movement.

Figure 9:
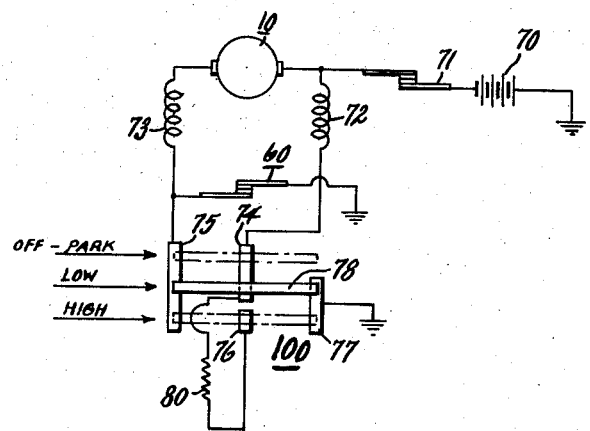
Fig. 9 is a schematic diagram of an electrical circuit for controlling the wiper mechanism.

With particular reference to Fig. 9, a typical circuit arrangement for energizing the motor 10 will be described. The circuit arrangement includes a battery 70, one terminal of which is connected to ground and the other terminal of which is connected by a wire through a thermal overload switch 71 to the motor armature and the shunt field winding 72. The armature is connected with a series field winding 73 and, thence, to a stationary contact 75 of a manually operable switch 100. The parking switch 60 is shown in the closed position, in Fig. 9, wherein it connects the series field winding 73 to ground. The shunt field winding 72 is connected to a stationary contact plate 74. The switch 100 also includes stationary contact plates 76 and 77, as well as a movable contact plate 78. Contact plates 74 and 76 are interconnected through a resistor 80, which is employed to vary the energization of the shunt field winding 72 so as to control motor speed.

The manually positionable contact plate 78 is connected by a link 79 to a lever 90, as shown in Fig. 8. The lever 90 is interconnected with the lever 50 through a slot 91, the lever 90 being movable about pivot point 46 by means of a cable 92 having connection with a knob 93, as shown in Fig. 1. When the knob 93 is actuated to interrupt wiper operation, the lever 90 is actuated to move lever 50 to the position of Fig. 5, and the contact 78 is moved to the "off" position through link 79. Thus, whenever the knob 93 is operated to discontinue wiper operation, the element 45 is adjusted so that continued rotation of the worm gear 31 will be effective to automatically adjust the mechanical movement so that the amplitude of oscillation imparted to the driven member 12 will be increased. At this time, the motor 10 is energized through the closed contact of the parking switch 60. When the component parts of mechanical movement reach the position depicted in Fig. 5, the coil spring clutch 25 will be disengaged and concurrently therewith the switch 60 will be opened to deenergize the motor. The movable contact plate 78 is shown in the low speed "on" position in Fig. 9, wherein stationary contact plates 74, 75 and 77 are interconnected, lever 90 is in the position of Fig. 8, while lever 50 is in the position of Figures 3 and 4 with the element 45 in its running position.

*Operation*

Assuming that wiper blades 18 and 19 to be in the parked position, a complete cycle of wiper operation will be described. When the operator moves the knob so that lever 90 is moved to the position of Fig. 8, the switch contact 78 will be moved to the position of Fig. 9, and the lever 50 will be moved to the position shown in Figs. 3 and 4. Consequently, the motor 10 will be energized irrespective of the fact that the parking switch 60 is open, and the spring assembly 28 will be moved from the position of Fig. 5 to the position of Fig. 4 through the over-center spring 52. Thus, the coil spring clutch will be engaged since sleeve 29 is free to rotate. Accordingly, rotation will be imparted to shaft 23 and the worm gear 31 and in this manner movement will be imparted through the compound linkage to the shaft 12. During movement of the connecting rod between the positions shown in Fig. 3 and Fig. 4, the lever 41 will be moved in a counterclockwise direction due to its connection with connecting rod 34 through link 37. When the lever 41 has been moved from the position of Fig. 5 to the position of Fig. 4, the retaining element 45 will prevent further movement thereof due to the swinging forces of the links 36 and 37, inasmuch as ear 45a will engage shoulder 42 and the pin 49 engages the edge of aperture 44. At this time, mechanical movement will be operative to effect oscillation of the blades 18 and 19 throughout the angle E. The speed of wiper operation can be controlled by manipulation of the knob 93 so as to position contact 78 in either the low or high speed position. Movement of the switch contact 78 between the high and low speed positions is effected by movement of lever 90, which, in turn, effects movement of lever 50. However, this movement does not actuate the retaining element 45 since the centerline of the spring 52 does not cross the center of pivot point 46.

Figure 7:
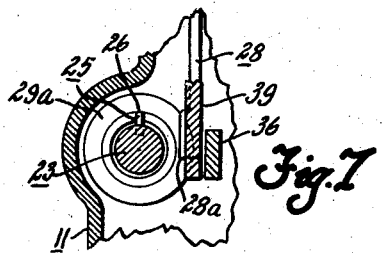
Fig. 7 is a fragmentary view, partly in section and partly in elevation, taken along line 7—7 of Fig. 5.

When the operator decides to stop wiper operation and park the wiper blades, the knob 93 is manipulated so that the contact 78 is moved to the "off" position through the lever 90 and link 79. At this time, the parking switch 60 will control energization of the motor 10. The lever 50 will be moved simultaneously with the switch contact 78 so that the centerline of spring 52 passes over the center of pivot point 46, as is shown in Fig. 5, whereupon the element 45 will be moved from the position of Fig. 4 to the position of Fig. 5. Moreover, movement of the lever 50 from the position of Fig. 5 will position the leaf spring assembly 28 in a position where it may be engaged by the arm 39. Accordingly, the lever 41 is freed for movement due to the swinging forces imparted thereto by the compound linkage such that during movement of the connecting rod from the position of Fig. 4 to the position of Fig. 3, the lever 41 will be moved in a clockwise direction, thereby displacing the pivot point 40 so as to increase the effective operating length of the connecting rod. The lever 41 is latched in the position of Fig. 5 by ear 45b of the element. Thus, the amplitude of oscillation imparted to the shaft 12 is increased to the angle E+F, and when the arm 39 reaches the position of Fig. 5, which represents the parked position of the blades 18 and 19, it will engage spring arm 28a and deflect spring arm 28b into engagement with the flange 29a of sleeve 29, as shown in Figs. 5 and 7, thereby restraining rotation of clutch sleeve 29 causing the spring 25 to unwind and interrupt the driving connection between shafts 20 and 23, as shown in Fig. 6. Concurrently, with movement of the arm 39 to the position of Fig. 5, the lug 53 on the shaft 12 will move to the dotted line position of Fig. 8 so as to engage spring 61 and separate contacts 62 and 63 so as to deenergize the motor 10.

From the aforegoing, it is manifest that this invention provides power driven wiper actuating mechanism wherein the wiper blades are driven into the parked position, and retained in such position while the rotary driving means is disconnected from the mechanical movement and permitted to coast to a standstill after deenergization thereof. Moreover, the wiper blades will automatically be moved to the parked position upon movement of the manual control switch to the "off" position, thereby obviating the necessity for critical manipulations of the control switch.

While the embodiment of the present invention as herein disclosed, constitutes a preferred form, it is to be understood that other forms might be adopted.

What is claimed is as follows:

1. In a mechanical movement of the character described, a member mounted to be oscillated, a movable operating link connected at one end to oscillate said member, an adjusting link movably connected at the other end of said operating link, means applying swinging force to said links, a pivot connection movable between predetermined positions and connected to said adjusting link, said first recited means including a rotatable driving member and a rotatable driving element normally drivingly connected to rotate therewith, means operatively connected with the pivot point connection of said adjusting link for freeing said movable pivot point connection for movement from one position to another position by the swinging forces applied to said links whereby the amplitude of oscillation imparted to said oscillatable member may be varied, and means controlled by said oscillatable member when the oscillation imparted thereto is a maximum for interrupting the driving connection between said driving member and said driving element.

2. In a mechanical movement of the character described, a member mounted to be oscillated, a movable operating link connected at one end to oscillate said member, an adjusting link movably connected at the other end of said operating link, means applying swinging force to said links substantially at the point of movable connection therebetween, a pivot connection movable between predetermined positions and connected to said adjusting link, said first recited means including a rotatable driving member and a rotatable driving element normally drivingly connected to rotate therewith, means operatively connected with the pivot point connection of said adjusting link for freeing said movable pivot point connection for movement from one position to another position by the swinging forces applied to said links whereby the amplitude of oscillation imparted to said oscillatable member may be varied, and means controlled by said oscillatable member when the oscillation imparted thereto is a maximum for interrupting the driving connection between said driving member and said driving element.

3. In a mechanical movement of the character described, a rotatable driving member, a rotatable driving element, disengageable clutch means normally drivingly connecting said driving member and driving element, an oscillatable driven member, means interconnecting said driving element and said driven member for imparting oscillation to said driven member upon rotation of said driving element, and means operatively connected with said interconnecting means and actuated by rotation of the driving element for adjusting said interconnecting means so as to increase the amplitude of oscillation imparted to said driven member and thereafter disengage said clutch means to interrupt the driving connection between said driving member and driving element.

4. Means for oscillating a shaft having an arm extending therefrom, including in combination, a rotatable crank, a connecting rod having one end pivotally connected to said crank, a rotatable driving member drivingly connected to said crank for imparting rotation thereto, an operating link pivotally connected to one end of said arm, the other ends of said operating link and said connecting rod being pivotally interconnected whereby a swinging force is applied to said operating link by said connecting rod during rotation of said crank, an adjusting link swingably connected at one end to the pivotal connection between the connecting rod and the operating link, a movable pivot connection for the other end of said adjusting link, means carrying said movable pivot point connection, means operatively connected with said last recited means for successively freeing, and then locking, said pivot point carrying means for movement by the swinging forces applied to said links whereby the amplitude of oscillation imparted to said shaft may be varied, and means operatively connected with said oscillatable shaft for interrupting the driving connection between the driving member and said crank when the amplitude of oscillation imparted to said shaft is a maximum.

5. The combination set forth in claim 4 wherein the driving connection between the driving member and the crank comprises disengageable clutch means.

6. Windshield wiper actuating mechanism including in combination, a rotatable driving member, a rotatable driving element, disengageable clutch means operable to establish a driving connection between said driving member and said driving element, an oscillatable driven member, a connecting rod having one end pivotally connected to said driving element at a point displaced from the axis thereof, a link having one end pivotally connected to the other end of said connecting rod, an arm attached to said driven member and extending therefrom, the free end of said arm and the other end of said link being pivotally interconnected whereby rotation of the driving element will impart oscillation to said driven member, and means operatively connected with said connecting rod and said link and operable by rotation of said driving element for varying the amplitude of oscillation imparted to said driven member and thereafter interrupting the driving connection between said driving member and driving element by disengaging said clutch means.

7. The combination set forth in claim 6 wherein the rotatable driving member comprises an electric motor.

8. The combination set forth in claim 6 wherein the rotatable driving member comprises an electric motor, an energizing circuit for said motor, and wherein said mechanism includes means for automatically deenergizing said electric motor when the amplitude of oscillation imparted to said driven member is a maximum.

9. The combination set forth in claim 8 wherein the means for deenergizng the motor comprises a switch, connected in said circuit, and wherein the switch and the clutch disengaging means are operated concurrently when the amplitude of oscillation imparted to said driven member is the maximum.

10. Windshield wiper actuating mechanism, including in combination, a rotatable driving member, a rotatable driven member, said members having coaxially arranged portions, a coil spring clutch for establishing a driving connection between said members, an oscillatable driven element, means interconnecting the driven member and the driven element for imparting oscillation thereto upon rotation of said driven member, and manually controlled means operatively associated with said clutch for effecting disengagement of said clutch upon oscillation of said driven element to a predetermined position.

11. Windshield wiper actuating mechanism, including in combination, a rotatable driving member, a rotatable driven member, said members having coaxially arranged portions, a coil spring clutch having closely wound convolutions encompassing said coaxially arranged portions, a rotatable sleeve encompassing said spring clutch, one end of said spring clutch being attached to said sleeve, and the other end being attached to one of said members whereby the closely wound convolutions of said spring clutch normally establish a driving connection between said members, an oscillatable driven element, means interconnecting said driven member and driven element for imparting oscillation thereto upon rotation of said driven member, and manually controlled means operatively engageable with said sleeve for restraining rotation thereof upon oscillation of said driven element to a predetermined position so as to cause an unwinding of the convolutions of said spring clutch to interrupt the driving connection between said driving and driven members.

12. Windshield wiper actuating mechanism, including in combination, a rotatable driving shaft, a rotatable driven shaft, said shafts having coaxially arranged portions, a coil spring clutch having closely wound convolutions circumscribing said coaxially arranged portions, a rotatable sleeve encompassing said spring clutch, one end of said spring being attached to said sleeve and the other end of said spring being attached to one of said members whereby the closely wound convolutions thereof normally establish a driving connection between said members and impart rotation to said sleeve, an oscillatable element, means interconnecting said driven member and said element for imparting oscillation thereto upon rotation of said driven member, a manually controlled brake member, and means engageable with said brake member for urging it into engagement with said sleeve so as to restrain rotation of said sleeve and effect an unwinding of said closely wound spring convolutions to thereby interrupt the driving connection between said driving and driven members at a predetermined position of said oscillatable element.

13. Windshield wiper actuating mechanism including in combination, a rotatable driving member, an oscillatable driven member, means interconnecting said members capable of imparting oscillation to said driven member upon rotation of said driving member including disengageable clutch means, means operatively connected with said interconnecting means and operable by oscillation of said driven member for interrupting the driving connection between said driving and driven members so as to prevent oscillatory movement of the driven member upon rotation of the driving member, and manually operable means for controlling the operation of said interrupting means.

14. Windshield wiper actuating mechanism including in combination, a rotatable driving member, an oscillatable driven member, means interconnecting said members capable of imparting oscillation to said driven member upon rotation of said driving member including disengageable clutch means, said interconnecting means also including a driving element, said clutch means constituting a driving connection between said driving member and said driving element whereby when the clutch means is engaged rotation of the driving member will impart rotation to the driving element, and a connecting rod having one end pivotally connected to said driving element at a point displaced from the axis thereof, said connecting rod being operatively connected to said driven member so as to impart oscillation thereto upon rotation of said driving element, means operatively connected with said interconnecting means and operable by oscillation of said driven member for interrupting the driving connection between said driving member and said driving element so as to prevent oscillatory movement of the driven member upon rotation of the driving member, and manually operable means for controlling the operation of said interrupting means.

15. Windshield wiper actuating mechanism including in combination, a rotatable driving member, an oscillatable driven member, means interconnecting said members capable of imparting oscillation to said driven member upon rotation of said driving member including disengageable clutch means, said interconnecting means also including a rotatable driving element, said clutch means when engaged establishing a driving connection between said driving member and said driving element, a connecting rod having one end pivotally connected to said driving element at a point displaced from the axis thereof, a link having one end pivotally connected to the other end of said connecting rod, the other end of said link being operatively connected to said driven member whereby rotation of said driving element will impart oscillation to said driven member and means operatively connected with said link and operable by rotation of said driving element for varying the amplitude of oscillation imparted to said driven member, means operatively connected with said interconnecting means and operable by oscillation of said driven member for interrupting the driving connection between said driving member and said driving element, and manually operable means for controlling the operation of said interrupting means.

References Cited in the file of this patent

UNITED STATES PATENTS

| | | |
|---|---|---|
| 2,308,212 | Scott-Iversen | Jan. 12, 1943 |
| 2,403,233 | Patch | July 2, 1946 |
| 2,452,496 | Schneider | Oct. 26, 1948 |
| 2,667,249 | Bell | Jan. 26, 1954 |
| 2,669,331 | Dudis | Feb. 16, 1954 |